United States Patent [19]
Dheilly

[11] 3,781,646
[45] Dec. 25, 1973

[54] CURRENT SUPPLY COMPRISING AN ASYMMETRIC RECTIFIER ARRANGEMENT

[75] Inventor: Jacky Dheilly, Amiens, France

[73] Assignee: U.S. Philips Corporation, New York, N.Y.

[22] Filed: Oct. 3, 1972

[21] Appl. No.: 294,680

[30] Foreign Application Priority Data
Dec. 6, 1971 France .................... 7143692

[52] U.S. Cl. ................. 321/47, 307/321, 318/227
[51] Int. Cl. ............................................ H02m 7/20
[58] Field of Search ............... 307/321; 321/8, 16, 321/18, 47

[56] References Cited
UNITED STATES PATENTS

| | | | |
|---|---|---|---|
| 3,364,412 | 1/1968 | Sauter............................. | 321/18 X |
| 3,494,204 | 2/1970 | Whitehead...................... | 323/75 E |
| 3,250,991 | 5/1966 | Beeston, Jr...................... | 323/75 E |
| 3,461,375 | 8/1969 | Nestler et al. .................. | 321/47 X |
| 3,050,675 | 8/1962 | Williams, Jr..................... | 321/47 X |
| 3,123,763 | 3/1964 | Kettler............................. | 321/18 X |
| 3,218,540 | 11/1965 | Jackson ............................ | 321/18 |
| 3,356,928 | 12/1967 | Parrish............................. | 321/46 X |

Primary Examiner—William M. Shoop, Jr.
Attorney—Frank R. Trafari

[57] ABSTRACT

Full-wave rectified current supply comprising a single thyristor the gate electrode of which is connected to an electronic control circuit, which supply is connected to a direct-current motor. Varying the conduction angle of the thyristor enables torques of different values to be obtained in order to achieve regulation of the speed of the motor.

Applications: direct-current motors, washing machines, etc.

9 Claims, 6 Drawing Figures

CURRENT SUPPLY COMPRISING AN ASYMMETRIC RECTIFIER ARRANGEMENT

The present invention relates to a current supply comprising an asymmetric rectifier circuit. The invention relates in particular to a supply of full-wave rectified current which comprises a full-wave rectifier arrangement and means for controlling the full-wave rectified current.

Such full-wave or half-wave rectified current supplies are used in particular for feeding direct-current motors. They generally comprise means which enable the output current to be varied in accordance with the requirements of the motor supplied.

In general, in such supply arrangements it is known to use a bridge rectifier which comprises two diodes the anodes of which, for example, are interconnected (negative terminal of the rectified current supply) and the cathodes of which are connected respectively to the anodes of two thyristors and to the terminals of the alternating-voltage source. The cathodes of the thyristors are interconnected (positive terminal of the rectified current supply) while their gate electrodes are connected to a device which controls their conduction angle. Such a system enables a full-wave rectified voltage to be obtained between the positive and negative terminals of the supply, while each half-cycle may be controlled by one of the thyristors in a manner such that the output current of the supply may be varied from zero (the two thyristors being continually blocked) to a given maximum value (the two thyristors being continually conducting). Moreover, for reasons of simplicity, the control of the conduction angle of the two thyristors is generally effected by means of the same device, i.e. the current is varied by influencing both thyristors simultaneously.

Such an arrangement has many disadvantages the most important of which is that it is comparatively complicated because it comprises two thyristors and associated control circuits. This arrangement is not always utilized at full capacity and hence often is too expensive for many applications.

The arrangement according to the invention avoids these disadvantages because it is simpler and more economical while giving an excellent performance. It consists substantially of an asymmetrical rectifier circuit which comprises a single thyristor which is controlled by a triggering circuit which compares a reference voltage with the voltage applied by the circuit to the terminals of the motor supplied. The detection of a difference between these two voltages permits the thyristors to be made conductive according to a greater or smaller conduction angle. Thus every second half-cycle of the rectified current may be regulated, while the other half-cycle is not influenced. Such an arrangement consequently is far simpler because it uses only a minimum number of elements, which greatly reduces its cost. On the other hand, it enables the "flicker" to be substantially suppressed without the use of an additional circuit.

According to the invention there is provided a supply of full-wave rectified current which comprises a full-wave rectifier arrangement and means for controlling the full-wave rectified current, characterized in that the rectifier arrangement comprises a single controlled rectifier device.

The invention is further characterized in that the rectifier arrangement is supplied from a transformer (or auto-transformer) the secondary of which has an asymmetrical tapping.

Another feature of the invention is that the rectifier arrangement is a rectifier bridge which comprises three diodes and a thyristor and may include an additional resistor.

Another feature of the invention is that the fectifier arrangement is a rectifier bridge which comprises two resistors, a diode and a thyristor.

Another feature of the invention is that in an application of the arrangement according to the invention which is intended specifically for washing machines at least one resistor of the rectifier bridge is used for heating the wash water.

The invention will be described in greater detail with reference to the accompanying drawing in which:

FIG. 1 shows a first embodiment of the supply arrangement which comprises a transformer, FIG. 2 shows a second embodiment of the supply arrangement, FIG. 3 shows the waveforms of the output current of the supply arrangement of FIG. 2, and FIG. 4 shows a third embodiment of the supply arrangement which is especially intended for washing machines.

Referring now to FIG. 1, an alternating-voltage source feeds a transformer 1 the secondary winding of which is connected at a point 6 to a controlled rectifier 3, to a circuit 5 for triggering the controlled rectifier 3, and to a reference voltage source 7. The other end of this secondary winding is connected to a rectifier 4 the other end of which is connected to a motor 8 and to the controlled rectifier 3. The gate electrode 10 of the controlled rectifier 3 is connected to the triggering circuit 5. The negative terminal of the supply arrangement, to which the motor 8 and the reference voltage source 7 are connected, is connected to a point 2 on the secondary winding of the transformer 1, dividing this winding into two asymmetrical parts 11 and 12.

Let $i_1$ and $i_2$ be the currents which flow through the controlled rectifier 3 and the rectifier 4 respectively. The tapping 2 on the secondary is chosen so that the current $i_2$ flows through the rectifier 4 has a value sufficient to allow the motor 8 to run at a speed v (which corresponds to a voltage U at its terminals) when the motor torque is small, in which case the controlled rectifier 3 is blocked.

When the torque to which the motor 8 is subjected increases, the speed v and the voltage U at the terminals of the motor 8 decrease. The reference voltage V applied by the reference voltage source 7 then exceeds the voltage U. This causes the controlled rectifier 3 to be rendered conductive by means of the triggering circuit 5, so that a current $i_1$ flows through the controlled rectifier 3, which tends to increase the voltage U at the terminals of the motor 8. The maximum torque of the motor 8 corresponds to full conduction of the controlled rectifier 3.

FIG. 2 shows a second embodiment of the invention in which the rectifier elements are a diode and a thyristor. Elements corresponding to those of FIG. 1 are denoted by the same reference numerals.

A first terminal of the alternating-voltage source (not shown in the Figure) is connected to a resistor $R_1$ and to the anode of a diode $D_1$, while the other terminal of this alternating-voltage source is connected to a resistor $R_3$ and also to a resistor $R_2$ and to the anode of a thyristor Th. The cathode of the diode $D_1$ and the cathode of the thyristor Th are connected to the motor 8 the other end of which is connected to the resistors $R_1$ and $R_2$. The gate of the thyristor Th is connected to a diode $D_5$ the other electrode of which is connected to the resistor $R_3$ and, via the reference-voltage source 7, to the resistors $R_1$ and $R_2$.

In this Figure the transformer of FIG. 1 is replaced by a divider bridge comprising the resistors $R_1$ and $R_2$, the alternating voltage being supplied either from the supply lines or from a transformer. Let $i_1$ be the current flowing through the resistor $R_1$ and the thyristor Th and let $i_2$ be the current which flows through the resistor $R_2$ and the diode $D_1$. For a given alternating-voltage supply the current $i_2$ is fixed and depends upon the value of the resistor $R_2$. Hence, in order to vary the current $i_1 + i_2$ which flows through the motor 8, the current $i_1$ is to be influenced by means of the thyristor Th. The maximum value of the current $i_1$ is determined by the resistor $R_1$. On the other hand, to run at a speed $v$ the motor 8 requires a voltage U at its terminals. When the motor shaft is subjected to a small torque, the current $i_1$ is zero and $i_2$ has a value such that the voltage drop across $R_2$ produces a voltage U across the terminals of the motor 8. Consequently, the thyristor Th is blocked. An increase in the torque to which the motor is subjected involves a decrease in the current $i_2$ and in the speed and back electromotive force of the motor. As a result the voltage U at the terminals of the motor decreases so that the reference voltage V exceeds the voltage U, which gives rise to the thyristor Th being triggered by means of $R_3$ and $D_5$. Thus a current $i_1$ is produced which adds to the current $i_2$, which gives rise to an increase in the torque to which the shaft of the motor is subjected, which tends to increase its speed. As soon as the speed has again reached the value $v$ the thyristor Th is blocked again. Thus the speed $v$ of the motor 8 is regulated irrespective of the value of the torque to which the shaft of the motor is subjected.

On the other hand the maximum current is determined so that the motor always operates at the speed $v$ by means of the resistor $R_1$ when the torque to which the motor shaft is subjected is a maximum. The current required to trigger the thyristor Th can be determined by the resistor $R_3$. The diode $D_5$ enables the thyristor Th to be triggered and at the same time protects it. The resistors $R_1$ and $R_2$, the diode $D_1$ and the thyristor Th constitute a rectifier bridge.

FIG. 3a shows the current for small torques (in full lines): the current $i_1$ is zero and only the current $i_2$ flows.

FIG. 3b shows the current for medium torques (in full lines): only part of the half-cycle which corresponds to the current $i_1$ is used.

FIG. 3c shows the current for the maximum torque to which the motor shaft is subjected: the thyristor Th is fully conducting in this case.

Figure 1:
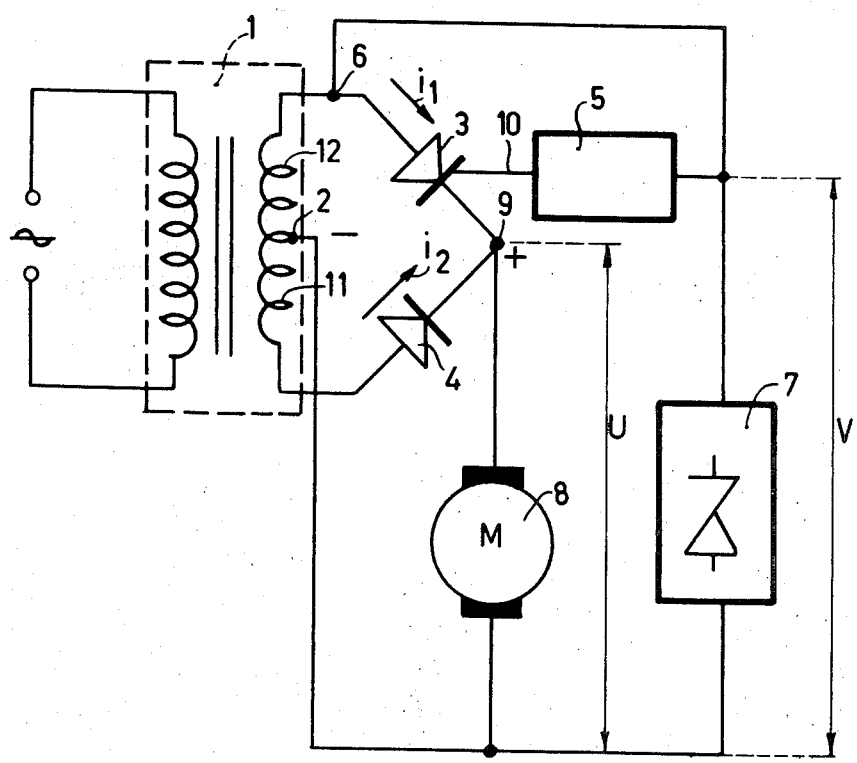
Figure 2:
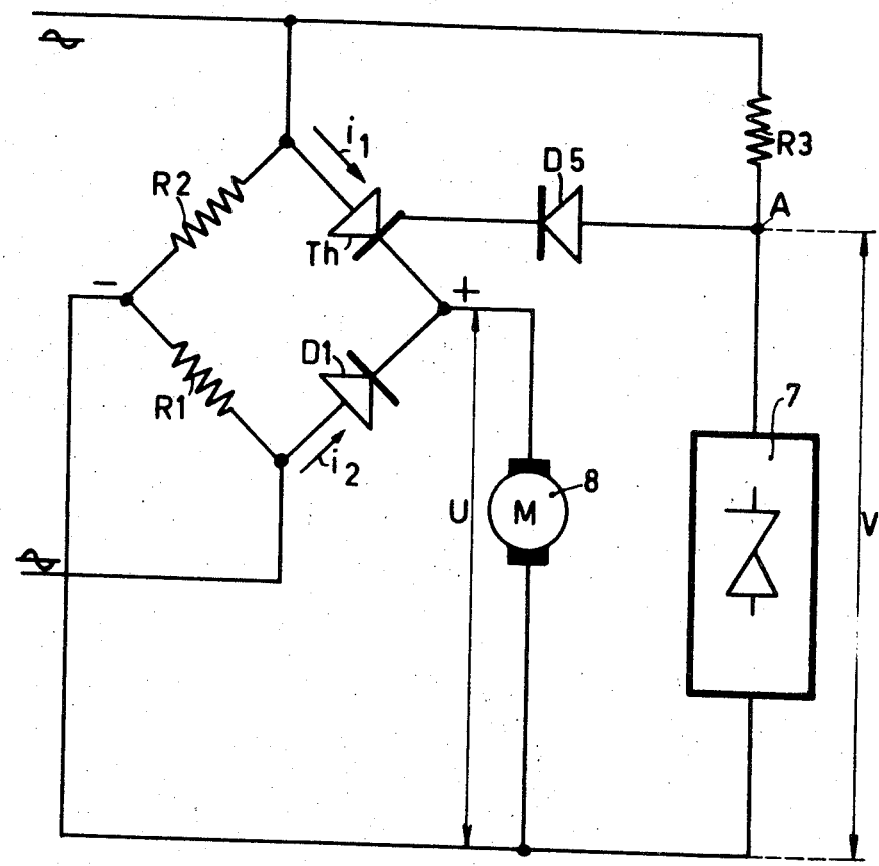
Figure 3:
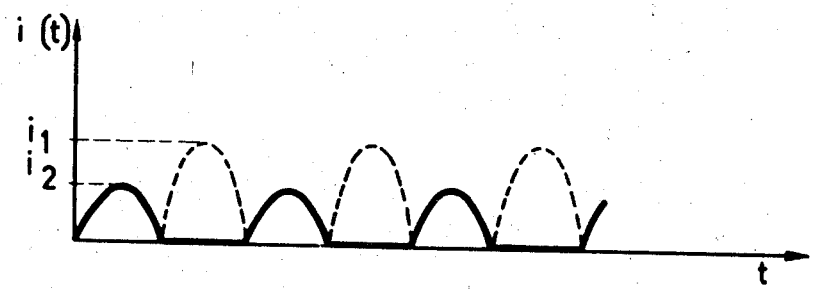
FIG. 3 shows the waveforms of the output current of the supply arrangement of FIG. 2 in accordance with the torque to which the shaft of the motor 8 is subjected.
Figure 3:
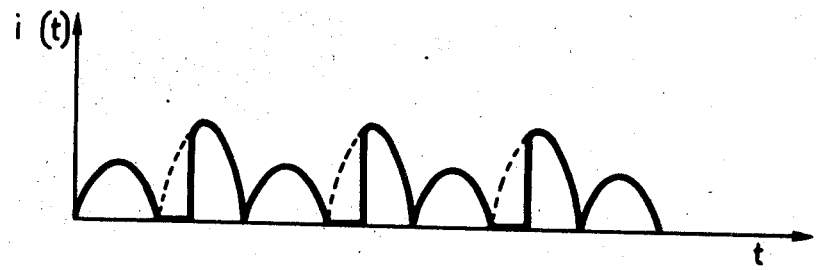
Figure 3:
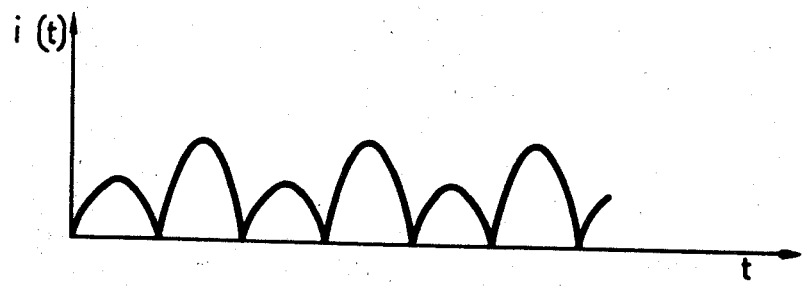

Elements corresponding to those of FIG. 2 are denoted by the same reference symbols. The rectifier bridge comprises diodes $D_1$, $D_2$ and $D_3$, a thyristor Th and a resistor $R_4$ connected between the anode of the diode $D_1$ and, via a resistor $R_5$, one terminal of the alternating-voltage source. A reversing switch G is connected to the terminals of the motor 8 and enables its direction of rotation to be reversed. The reference voltage source 7 comprises a diode $D_4$ is also connected in series. The cathode of the diode $D_4$ is also connected to a resistor $R_6$ and to a switch F which is connected to the negative terminal of the rectifier bridge. A switch E is connected between this negative terminal and the potentiometer P. The switch E switches the machine to the wash mode when it is closed and to the spin mode when it is open, while an intermediate spin speed may be obtained by closing the switch F. A switch H directly connects the resistor $R_5$ to the other terminal the alternating voltage source. When this switch is closed there is no current rectification, which enables the wash water to be heated by means of the resistor $R_5$ which is immersed in the tub (the resistor $R_4$ also is immersed in the tub).

The operation of the rectifier bridge is largely the same as that of the bridge shown in FIG. 2.

For small torques the thyristor Th remains blocked and the motor current is determined by $R_4$ and $R_5$.

For the largest torques the thyristor Th is triggered and the motor current is determined by $R_4 + R_5$ during one half-cycle and by $R_5$ for the other half-cycle. To ensure satisfactory operation of the motor, $R_5$ must have the smallest possible value, whereas $R_4$ must have the highest possible value.

Figure 4:
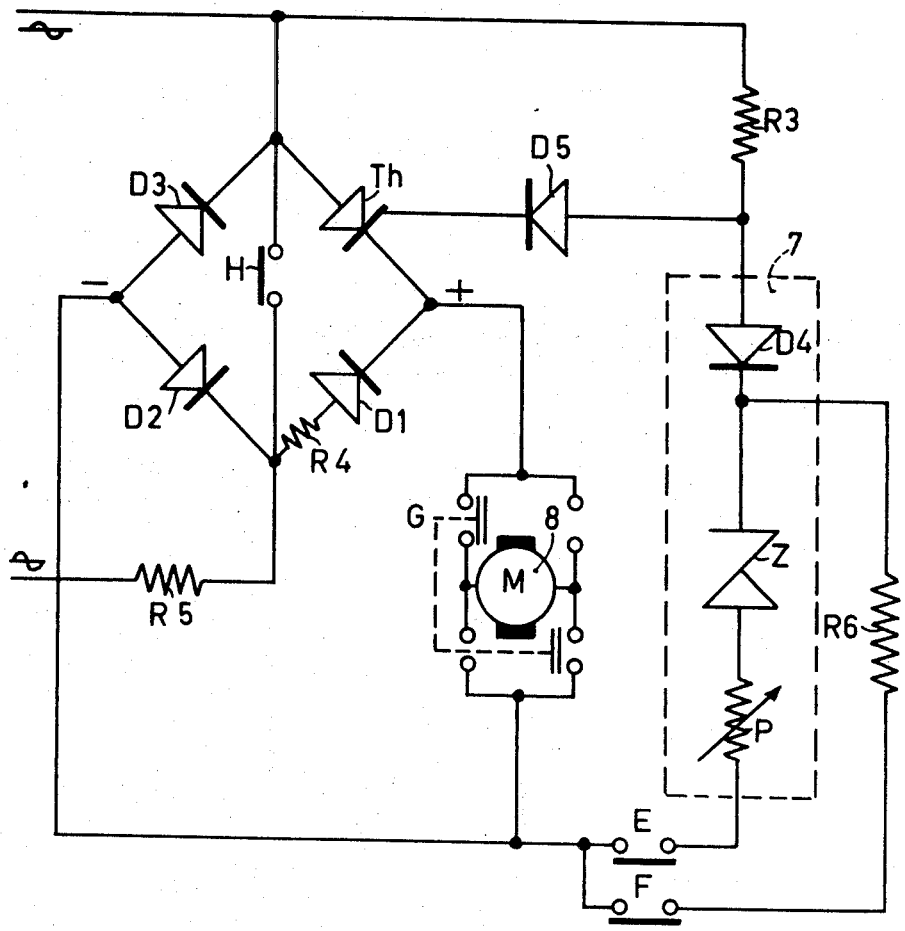
FIG. 4 shows an embodiment of the supply arrangement which is particularly intended for washing machines in order to obtain the operating modes as with the generally used circuits.

Results of tests carried out on a circuit as shown in FIG. 4 have led to the selection of the following elements:

$R_5$: 22Ω (2,200 W), immersion heater type
$R_4$: 8Ω (280 W), immersion heater type
$D_1$, $D_2$, $D_3$: B Y × 38
Th: B T 102
$R_3$: 2 kΩ (3 W)
Z: Zener diode 13 V (400 mW)
P: wound potentiometer, 100Ω
$D_4$, $D_5$: B Y × 10

Another embodiment of the invention is obtainable, for example, by replacing the diode $D_3$ of the circuit shown in FIG. 4 by the resistor $R_4$. However, this solution requires considerable cooling of the diode $D_2$ since a current rectified by $D_2$ will continuously flow between the two terminals of the alternating-voltage source. On the other hand, the various embodiments of the invention may be combined. The supply arrangement of FIG. 4 may be fed from a transformer or an auto-transformer. Furthermore, the rectifier arrangement of FIG. 4 may include a divider bridge comprising, for example, two resistors such as the resistors $R_1$ and $R_2$ of FIG. 2

Without departing from the scope of the invention any other combination of the various elements of the rectifier arrangement may be used which ensures that the arrangement retains its asymmetrical nature.

The same applies with respect to a transposition of the various elements of the rectifier bridge, primarily with a view to regulate the negative half-cycles of the alternating-voltage source.

What is claimed is:

1. A power supply for supplying full-wave rectified current to a DC motor comprising, a pair of supply input terminals for connection to a source of AC voltage, a full-wave rectifier bridge circuit with input terminals coupled to said supply terminals and output terminals coupled to said motor, said bridge circuit including a single controlled rectifier element in one arm of the bridge and a diode in a second arm of the bridge, said bridge further comprising asymmetrical impedance means arranged so that the maximum amplitudes of the rectified currents that the bridge can supply to the motor during alternate half cycles of the AC input voltage are substantially different, a source of reference voltage, and means for coupling said reference voltage and the motor terminal voltage cathode electrodes of the controlled rectifier so that the conduction period of the controlled rectifier is determined by the motor voltage.

2. A power supply as claimed in claim 1 wherein said asymmetrical impedance means comprises the secondary winding of a transformer which has an asymmetrical tap point forming one output terminal of the bridge and which divides said secondary winding into two unequal windings each of which forms an arm of the bridge circuit, said transformer including a primary winding coupled to the AC voltage source.

3. A power supply as claimed in claim 1 wherein the bridge circuit is supplied from an auto-transformer having a secondary winding with an asymmetrical tap point coupled to the motor.

4. A power supply as claimed in claim 1 further comprising second and third diodes connected in the third and fourth arms, respectively, of the bridge circuit.

5. A power supply as claimed in claim 4 further comprising a resistor connected in one arm of the bridge circuit.

6. A power supply as claimed in claim 1 further comprising first and second resistors connected in the third and fourth arms, respectively, of the bridge circuit.

7. A power supply as claimed in claim 6 wherein the resistance values of said first and second resistors are substantially unequal.

8. A power supply as claimed in claim 1 further comprising a second diode and a resistor which together with the controlled rectifier and the first diode form said bridge circuit.

9. A full-wave rectified current supply comprising, a transformer having a primary winding coupled to a source of AC voltage and a secondary winding having an asymmetrical tap that divides the secondary into two unequal windings, and a full-wave rectifier circuit coupling the two secondary windings to a load, said rectifier circuit including a single controlled rectifier for controlling the full-wave rectified current.

* * * * *